United States Patent
Toyoda

(10) Patent No.: US 8,023,006 B2
(45) Date of Patent: Sep. 20, 2011

(54) ELECTRONIC STILL CAMERA WHICH ACQUIRES PHOTOGRAPHY-SITE DATA AND IMAGE PROCESSING APPARATUS WHICH PROCESSES IMAGE DATA PHOTOGRAPHED BY ELECTRONIC STILL CAMERA

(75) Inventor: Kiyoshi Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 377 days.

(21) Appl. No.: 12/245,095

(22) Filed: Oct. 3, 2008

(65) Prior Publication Data

US 2009/0033768 A1 Feb. 5, 2009

Related U.S. Application Data

(63) Continuation of application No. PCT/JP2007/056472, filed on Mar. 27, 2007.

(30) Foreign Application Priority Data

Apr. 5, 2006 (JP) .................... 2006-104433

(51) Int. Cl.
*H04N 5/76* (2006.01)
(52) U.S. Cl. .................................... 348/231.5
(58) Field of Classification Search ............. 348/231.99, 348/231.3, 231.5, 231.6, 333.02
See application file for complete search history.

(56) References Cited

U.S. PATENT DOCUMENTS

| | | | |
|---|---|---|---|
| 6,507,371 B1 * | 1/2003 | Hashimoto et al. | 348/207.1 |
| 6,657,661 B1 | 12/2003 | Cazier | |
| 7,539,411 B2 * | 5/2009 | Uchiyama et al. | 348/231.3 |
| 2004/0189813 A1 * | 9/2004 | Tanaka | 348/207.99 |
| 2005/0213551 A1 | 9/2005 | Suzuki et al. | |
| 2006/0044401 A1 | 3/2006 | Park | |

FOREIGN PATENT DOCUMENTS

| | | |
|---|---|---|
| CN | 1674000 A | 9/2005 |
| EP | 0 855 835 A2 | 7/1998 |
| EP | 1 189 021 A1 | 3/2002 |
| EP | 1 580 977 A2 | 9/2005 |
| JP | 10-319494 A | 12/1998 |
| JP | 10319494 A * | 12/1998 |
| JP | 2001-36842 A | 2/2001 |
| JP | 2003-274320 A | 9/2003 |

(Continued)

OTHER PUBLICATIONS

Notification of Transmittal of Translation of the International Preliminary Report on Patentability (Form PCT/IB/338) of International Application No. PCT/JP2007/056472 mailed Nov. 27, 2008 with Forms PCT/IB/373 and PCT/ISA/237.

(Continued)

*Primary Examiner* — Jason Whipkey
(74) *Attorney, Agent, or Firm* — Westerman, Hattori, Daniels & Adrian, LLP

(57) ABSTRACT

An electronic still camera includes a position calculating unit. A storage unit stores the self-position data calculated by the position calculating unit, as photography-site data, in association with the image data acquired by photographing an object. If the self-position data cannot be acquired at the time of photographing the object, a control unit sets the self-position data acquired by the position calculating unit at a time different from the time of photographing the object, in the storage unit as the photography-site data.

6 Claims, 10 Drawing Sheets

FOREIGN PATENT DOCUMENTS

| | | | |
|---|---|---|---|
| JP | 2004-110599 A | | 4/2004 |
| JP | 2005-5953 A | | 1/2005 |
| JP | 2005005953 A | * | 1/2005 |
| JP | 2005-277619 A | | 10/2005 |

OTHER PUBLICATIONS

Chinese Office Action dated Jan. 8, 2010, issued in corresponding Chinese Patent Application No. 200780011531.9.

International Search Report of PCT/JP2007/056472, date of mailing Jul. 10, 2007.

Supplementary European Search Report dated Apr. 28, 2011, issued in corresponding European Patent Application No. 07739910.3.

Japanese Office Action dated Jul. 5, 2011, issued in corresponding Japanese Patent Application No. 2006-104433.

* cited by examiner

ELECTRONIC STILL CAMERA WHICH ACQUIRES PHOTOGRAPHY-SITE DATA AND IMAGE PROCESSING APPARATUS WHICH PROCESSES IMAGE DATA PHOTOGRAPHED BY ELECTRONIC STILL CAMERA

CROSS REFERENCE TO RELATED APPLICATIONS

This is a Continuation Application of PCT Application No. PCT/JP2007/056472, filed Mar. 27, 2007, which was published under PCT Article 21(2) in Japanese.

This application is based upon and claims the benefit of priority from prior Japanese Patent Application No. 2006-104433, filed Apr. 5, 2006, the entire contents of which are incorporated herein by reference.

BACKGROUND OF THE INVENTION

1. Field of the Invention

The present invention relates to an electronic still camera and an image processing apparatus for processing image data representing the images photographed with the electronic still camera. More particularly, the invention relates to an electronic still camera and an image processing apparatus, each having unit for detecting its own position, such as a GPS, and configured to store, display and print the photography-site data or photography-site environment data in association with image data.

2. Description of the Related Art

Hitherto, various electronic still cameras have been proposed, each able to store data items representing images photographed, in association with the data items representing the sites where the images have been photographed. For example, Jpn. Pat. Appln. KOKAI Publication No. 2001-36842 proposes a camera that has a global positioning system (GPS) used as unit for detecting its own position and unit for selecting data corresponding to the position data representing the position detected at the time of photography.

FIG. 11 is a block diagram illustrating the configuration of a conventional electronic still camera 1. The control unit 11 is a control unit that controls the sequence of the electronic still camera of FIG. 11. To the control unit 11, an operation unit 12 is connected. The operation unit 12 is composed of a display unit 121 and a switch unit 122. The display unit 121 is constituted by a display device such as LCD. The switch unit 122 is constituted by a plurality of switches including a power switch. The control unit 11 starts operating upon detecting that the power switch of the switch unit 122 has been turned on.

The imaging unit 13 has an imaging element such as a CCD. The imaging element receives the light coming from an object (not shown) and generates image data from the light. The image data is supplied via the control unit 11 to the storage unit 14. The storage unit 14 stores the image data acquired by the imaging unit 13, in association with the position data that represents the site where the image data has been acquired. The storage unit 14 has a nonvolatile memory such as flash ROM, or a disk drive such as hard disk drive.

The GPS receiving unit 15 has an antenna 151. The antenna 151 receives the positioning electromagnetic waves from GPS satellites, acquiring positioning data. The positioning data is output to the position calculating unit 16. The position calculating unit 16 calculates the position of the electronic still camera 1 from the positioning data output from the GPS receiving unit 15 and the provisional receiving position data stored in the storage unit 14. The position calculating unit 16 stores the position into the storage unit 14, as photography-site data. Further, the position calculating unit 16 updates the provisional receiving position data.

BRIEF SUMMARY OF THE INVENTION

According to a first aspect of the invention, there is provided an electronic still camera comprising: a position-data acquisition unit which acquires self-position data representing the position of the electronic still camera; a storage unit which stores the self-position data as photography-site data, in association with image data acquired by photographing an object; and a setting unit which sets, in the storage unit, the self-position data acquired by the position-data acquisition unit at a time different from a time of photographing the object, when the self-position data is not acquired at the time of photographing the object.

DETAILED DESCRIPTION OF THE INVENTION

Embodiments of the present invention will be described with reference to the accompanying drawings. Each of the embodiments that will be described below uses a GPS as unit for determining the self-position. Nevertheless, the position-determining mean is not limited to the GPS as long as it can detect the self-position. For example, a system that detects the self-position from the data transmitted from the base station of mobile radio devices, an apparatus that uses RFID tags, or a short-range radio system that transmits the data representing its own position may be used as a position-determining mean.

First Embodiment

Figure 1:
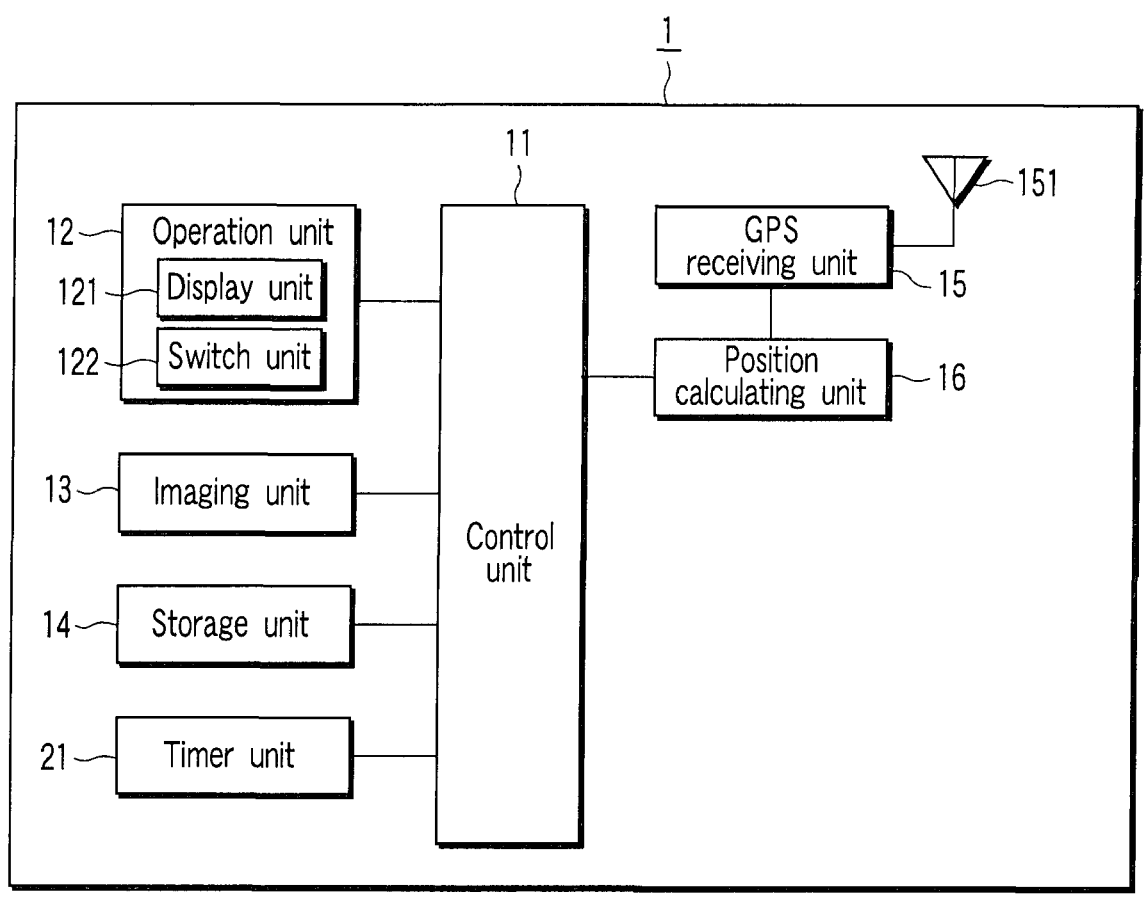
FIG. 1 is a block diagram showing a configuration an electronic still camera according to a first embodiment of the invention.

FIG. 1 is a block diagram showing a configuration an electronic still camera according to the first embodiment of this invention. The electronic still camera 1 comprises a control unit 11, an operation unit 12, an imaging unit 13, a storage unit 14, a GPS receiving unit 15, a position calculating unit 16, and a timer unit 21.

The control unit 11, which is a setting mean, controls the operating sequence of the electronic still camera shown in FIG. 1. To the control unit 11, the operation unit 12 is connected. The operation unit 12 has a display unit 121 and a switch (SW) unit 122. The display unit 121 is constituted by a display device such as LCD. The display unit 121 can display various images such as the images (photographed images) the user has photographed. The switch unit 122 comprises a plurality of switches, e.g., a power switch for turning on the electronic still camera 1, and release switch for causing the electronic still camera to perform photography operation. On receiving the signal generated as any switch of the switch unit 122 is operated, the control unit 11 controls the operating sequences of the electronic still camera.

The imaging unit 13 acquires image data. More precisely, the unit 13 has an imaging element such a CCD. The imaging unit receives the light coming from an object (not shown) and generates image data representing the image of the object. The image data thus generated in the imaging unit 13 is supplied via the control unit 11 to the storage unit 14 and is stored in the storage unit 14. The storage unit 14 is storing mean for storing data items. To be more specific, the storage unit 14 stores image data input from the imaging unit 13, in association with position data that represents the position where the image data has been obtained (photography position). The storage unit 14 comprises a nonvolatile memory such as flash ROM, or a disk drive such as a hard disk.

The GPS receiving unit 15 receives electromagnetic waves from GPS satellites (not shown) via an antenna 151, which its own position may be determined. The GPS receiving unit 15 generates data from the electromagnetic waves and supplies the data to the position calculating unit 16. The position calculating unit 16 calculates the position of the electronic still camera from the data output from the GPS receiving unit 15 and the provisional position data (i.e., data acquired previously in the position calculating unit 16). The position calculating unit 16 stores the position data thus generated in the storage unit 14, and updates the provisional position data.

The timer unit 21 measures time. Every time a preset period elapses, the timer unit 21 informs the control unit 11 of this event. The timer unit 21 is used to cause the position calculating unit 16 to calculate the position of the electronic still camera 1, at regular time intervals.

The first embodiment will be described with reference to a flowchart. Note that the flowchart, which will be referred to, is concerned mainly with the gist of the first embodiment, not showing the detailed overall operation of the electronic still camera.

Figure 2:
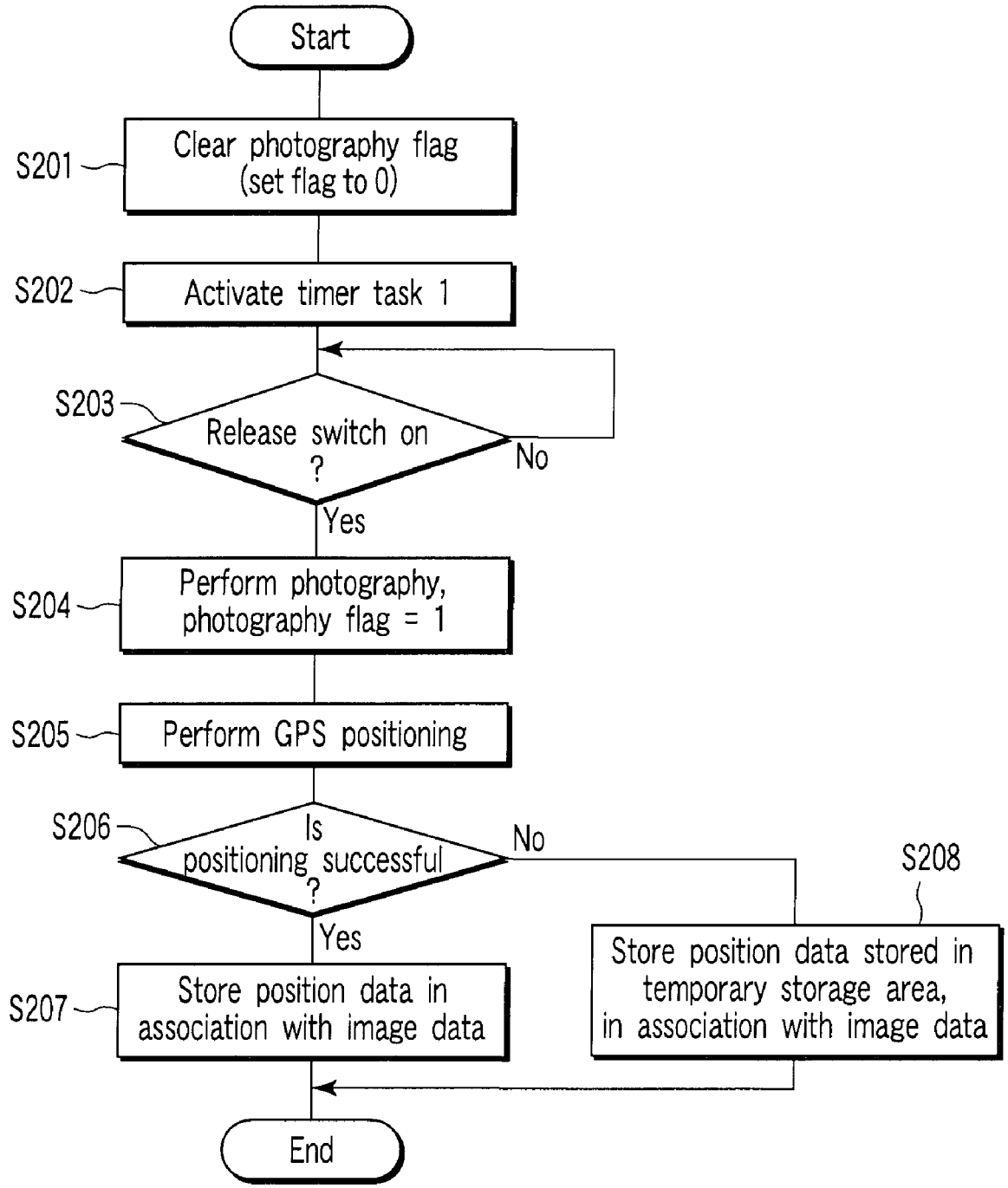
FIG. 2 is a flowchart explaining a process performed in a main task of the electronic still camera according to the first embodiment of the invention.
Figure 3:
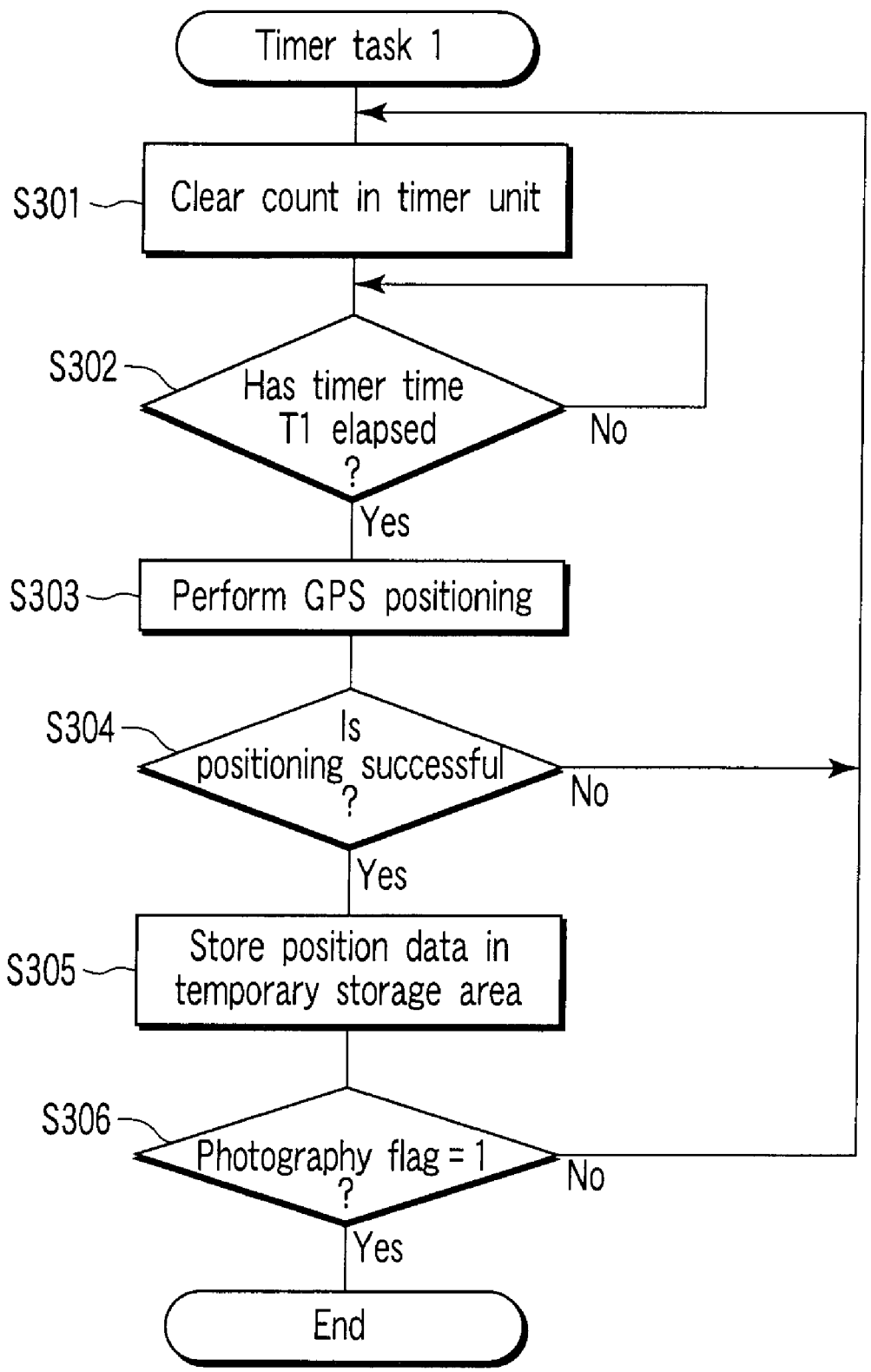
FIG. 3 is a flowchart explaining a process performed in a timer task 1.

FIG. 2 is a flowchart explaining the process performed in the main task of the electronic still camera according to the first embodiment. FIG. 3 is a flowchart explaining the process performed in a timer task 1 activated by the control unit 11 in the flowchart of FIG. 2. The task shown in FIG. 3 is not a sub-routine, but is a task of multi-task type. In the main task shown in FIG. 2, a sub-task only is activated, and the process goes to the next step, before the sub-task activated is terminated.

When a battery is loaded in the electronic still camera 1 or when the power switch of the switch unit 122 is turned on, the process shown in FIG. 2 starts. First, the control unit 11 initializes the photography flag that is stored in the storage unit 14 (Step S201). Note that the photography flag is flag that identifies the timing of turning on the release switch, halfway between the main task shown in FIG. 2 and the timer task shown in FIG. 3. In other words, the photography flag identifies the timing of photographing the object. The control unit 11 then activates the timer task 1 at prescribed intervals, for acquiring the data showing the position the camera 1 before photography actually starts (Step S202). The timer task 1 will be described later in detail.

After the timer task 1 is activated, the control unit 11 determines whether the release switch of the switch unit 122 has been turned on (Step S203). This step S203 is repeated until the release switch is turned on. If the release switch is found to have been turned on, the control unit 11 starts photography. Subsequently, the control unit 11 sets the photography flag to 1 (Step S204). Immediately after the completion of photography, the control unit 11 starts GPS positioning in order to acquire photography-site data (Step S205). Next, the control unit 11 determines whether the GPS positioning has been successfully performed (Step S206).

In Step S206, the GPS positioning may be found to have been successfully accomplished. In this case, the control unit 11 stores the position data thus acquired in the storage unit 14, as photography-site data, in association with the image data (Step S207). On the other hand, if the GPS positioning has failed, the control unit 11 stores the position data acquired in the timer task 1 (described later) as photography position data in the storage unit 14, in association with the image data (Step S208).

The timer task 1 which is activated in Step S202 shown in FIG. 2 will be explained with reference to FIG. 3. In the timer task 1, the control unit 11 first clears the count of the timer unit 21 (Step S301). The control unit 11 then causes the timer unit 21 to start measuring time. The unit 11 determines whether the time T1 preset in the timer unit 21 has elapsed (Step S302). The step S302 is repeated until the preset time T1 lapses. Note that, the time T1 represents the interval at which the GPS positioning is performed.

If the time T1 is found to have lapsed, in Step S302, the control unit 11 starts the GPS positioning (Step S303). Note that in the timer task 1, the GPS positioning is performed while the photographing is not underway in the electronic still camera 1. In this case, the smaller the power consumption, the better. In view of this, the preset time T1 should better be as long as possible. Nonetheless, if the time "T1" is too long, the difference between the photography time and the positioning time will be large. If this difference is large, the distance between the position where the GPS positioning is performed and the position where the photography is performed will be long. Hence, the preset time T1 should not be too long. The time T1 is therefore determined by trading off the power consumption with the measurement accuracy. Further, the preset time T1 is not limited to a particular value. It should better be changed in accordance with the intervals at which the release switch or the power switch is turned on or with the success rate of the GPS positioning.

After the GPS positioning has been performed, the control unit 11 determines whether the GPS positioning has succeeded or not (Step S304). If the GPS positioning has failed, the process returns to Step S301. In this case, the control unit 11 starts the GPS positioning again, upon lapse of the preset T1.

In Step S304, the GPS positioning may be found to have succeeded. If this is the case, the control unit 11 overwrites the position data in the temporary area of the storage unit 14 (Step S305). The control unit 11 then checks the photography flag, determining whether the flag is 1 or not (Step S306). If the photography flag is not 1, that is, if the photography has not been performed, the process returns to Step S301. In this case, the control unit 11 starts the GPS positioning, upon lapse of the preset time T1. If the photography flag is 1, the GPS positioning is no longer necessary. Therefore, the timer task 1 is terminated.

By virtue of the process described above, the self-position data obtained immediately before the object is photographed can be used as data representing the site where an object is photographed, even if no self-position data can be acquired when the object is photographed.

A first modification of the first embodiment will be described. The first modification can have the same configuration as shown in FIG. 1. Nonetheless, the process it performs differs from the process the first embodiment does. How the first modification operates will be explained, with reference to the main-task flowchart shown in FIG. 4 and the sub-task (timer task 2) flowchart shown in FIG. 5.

Figure 4:
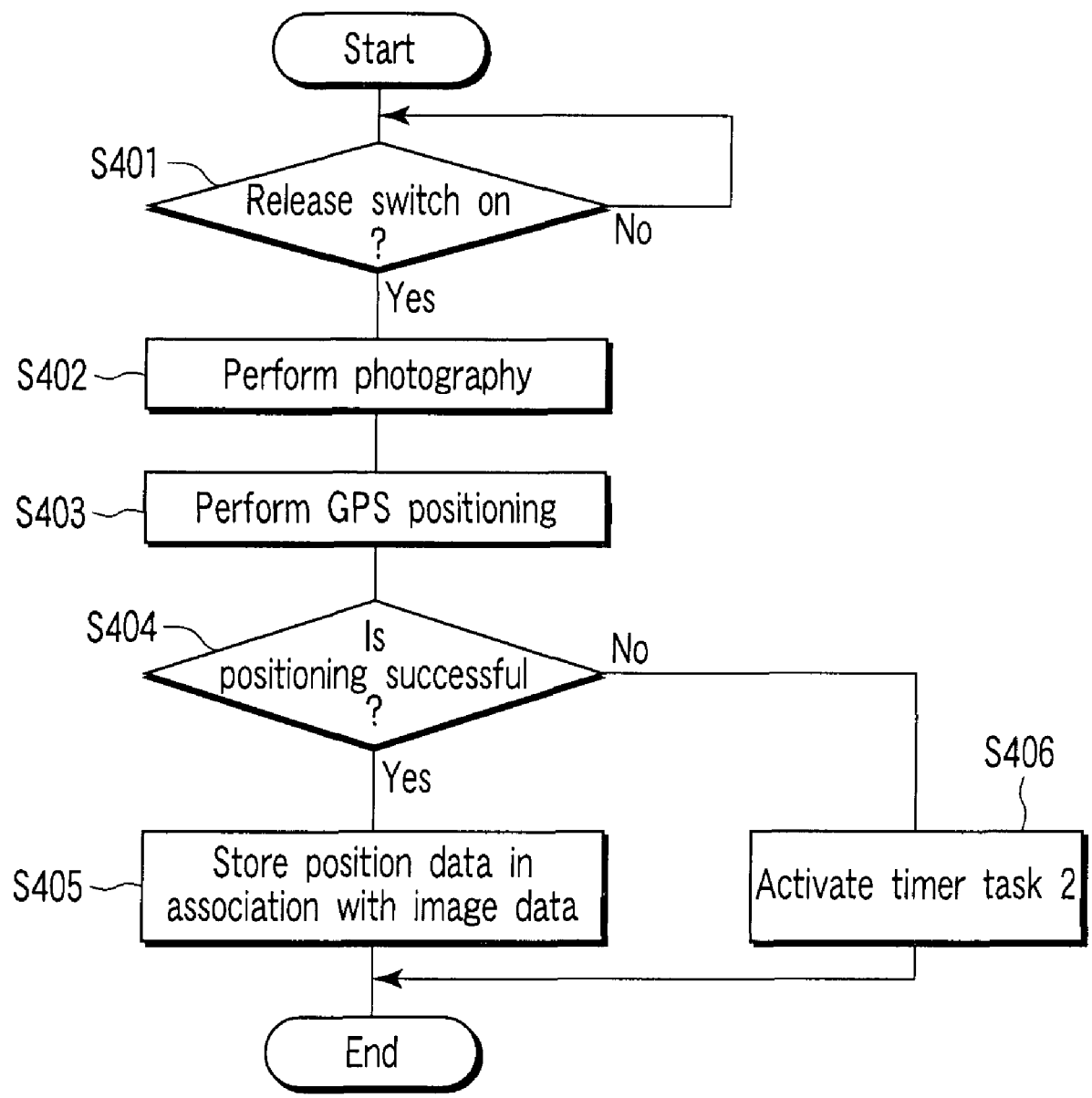
FIG. 4 is a flowchart explaining a process performed in a main task of a first modification of the first embodiment.
Figure 5:
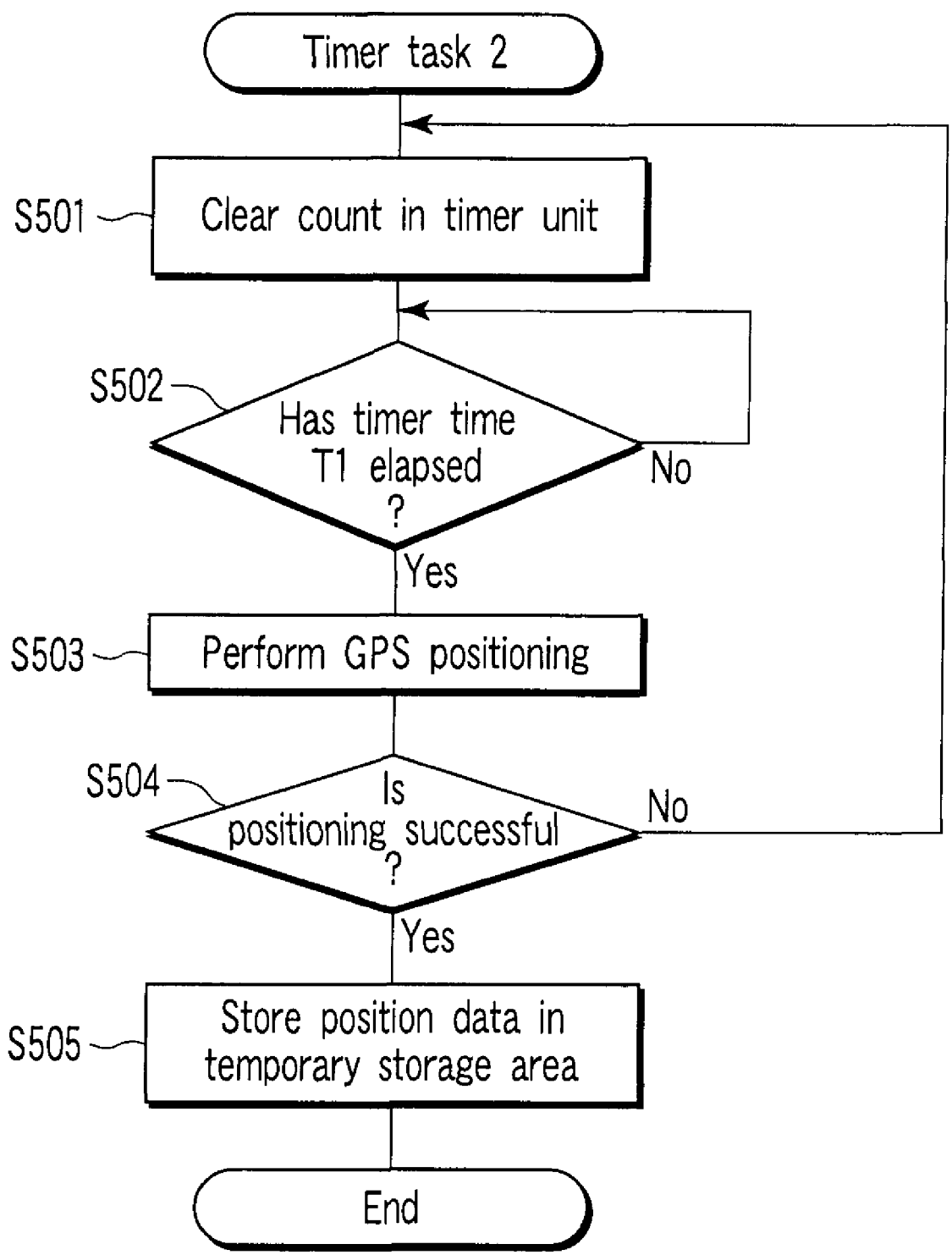
FIG. 5 is a flowchart explaining a process performed in a timer task 2.

The process of FIG. 4 starts when the battery is loaded in the electronic still camera 1 or when the power switch included in the switch unit 122 is turned on. First, the control unit 11 determines whether the release switch of the switch unit 122 has been turned on (Step S401). Step S401 is repeated until the release switch is turned on. In Step S401, the release switch may be found to have been turned on. Then, the control unit 11 starts photography (Step S402). Upon completion of the photography, the control unit 11 starts the GPS positioning in order to acquire data representing the photography site (Step S403).

After performing the GPS positioning, the control unit 11 determines whether the positioning is successful (Step S404). If the GPS positioning is found successful, in Step S404, the control unit 11 stores the position data, as data representing the photography site, in the storage unit 14 (Step S405). If the GPS positioning is found not successful, in Step S404, the control unit 11 activates the timer task 2 (Step S406).

The timer task 2 will be explained. The timer task 2 is similar to the timer task 1 in terms of basic sequence. In the timer task 2, however, the control unit 11 repeats the GPS positioning at intervals of preset time T1 until the GPS positioning is found successful (Steps S501 to S504). If the GPS positioning is found successful in Step S504, the control unit 11 stores the position data just acquired as photography-site data, in the storage unit 14, in association with the image data (Step S505).

By virtue of the process thus performed in the first modification, the self-position data obtained immediately after the object is photographed can be used as data representing the site where an object is photographed, even if no self-position data cannot be acquired when the object is photographed.

Figure 6:
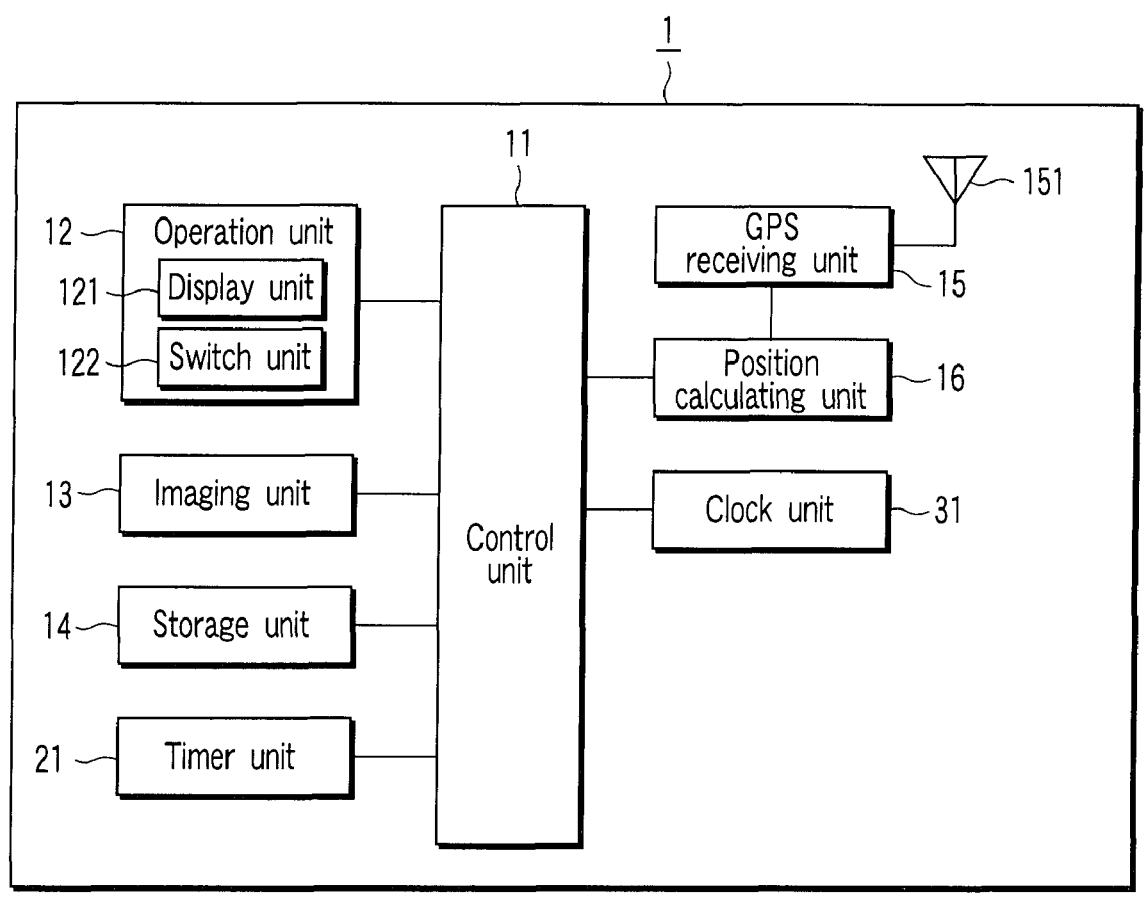
FIG. 6 is a block diagram showing a configuration of an electronic still camera according to a second modification of the first embodiment.

A second modification of the first embodiment will be described. FIG. 6 is a block diagram showing the configuration of an electronic still camera according to the second modification. The components identical to those shown in FIG. 1 are designated by the same reference numbers and will not be described. The second modification differs from the first embodiment in that a clock unit 31 is connected to the control unit 11. Because of the use of the clock unit 31, the process the control unit 11 performs differs from the process performed in the first embodiment, as will be later explained in detail.

The clock unit 31 shown in FIG. 6 is provided to inform the control unit 11 of the present time. The clock unit 31 can be constituted by, for example, a module called a real-time clock or a similar component.

The operation the second modification performs will be explained with reference to the main-task flowchart of FIG. 7 and the sub-task flowchart of FIG. 8.

Figure 7:
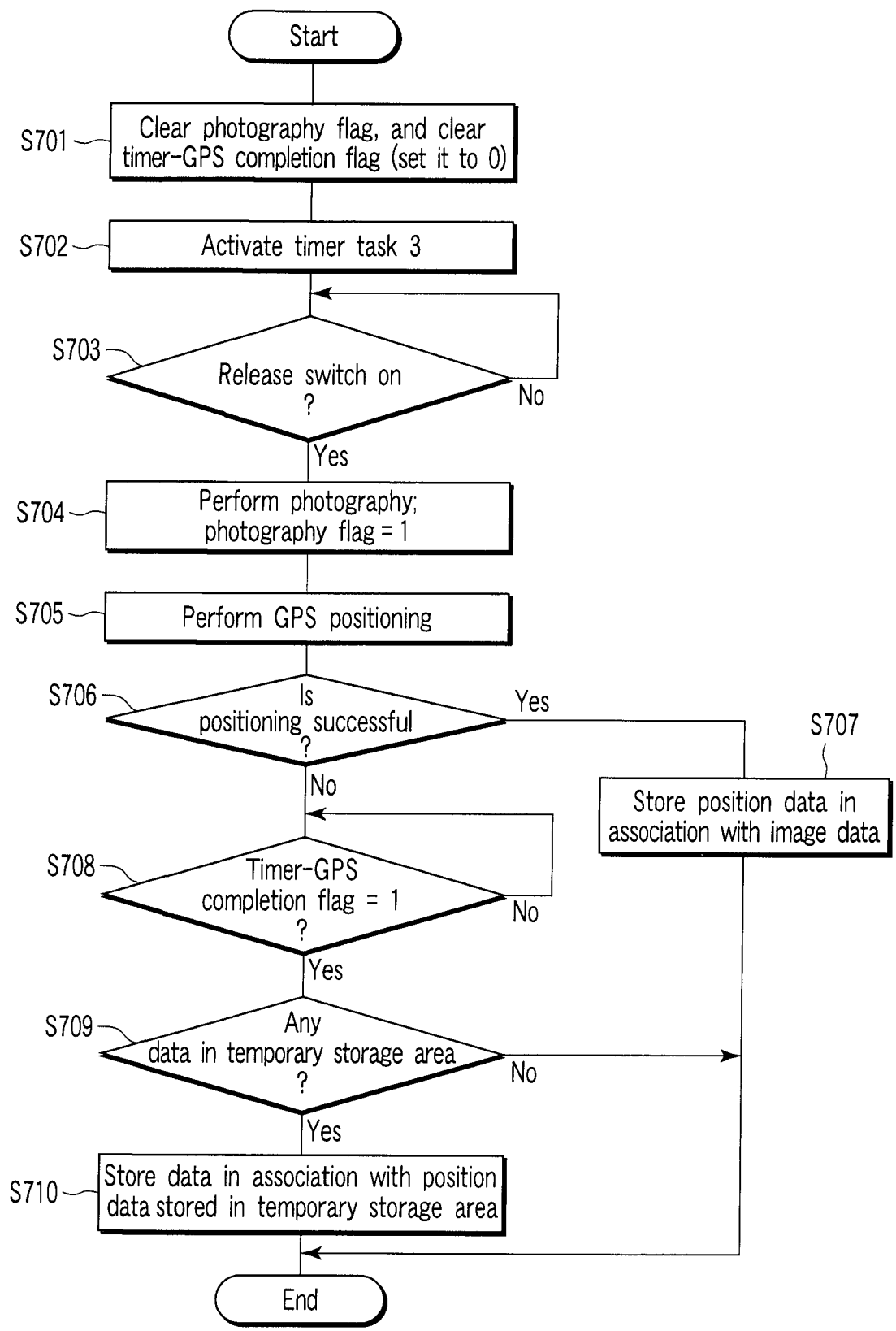
FIG. 7 is a flowchart explaining a process performed in a main task of a second modification of the first embodiment.
Figure 8:
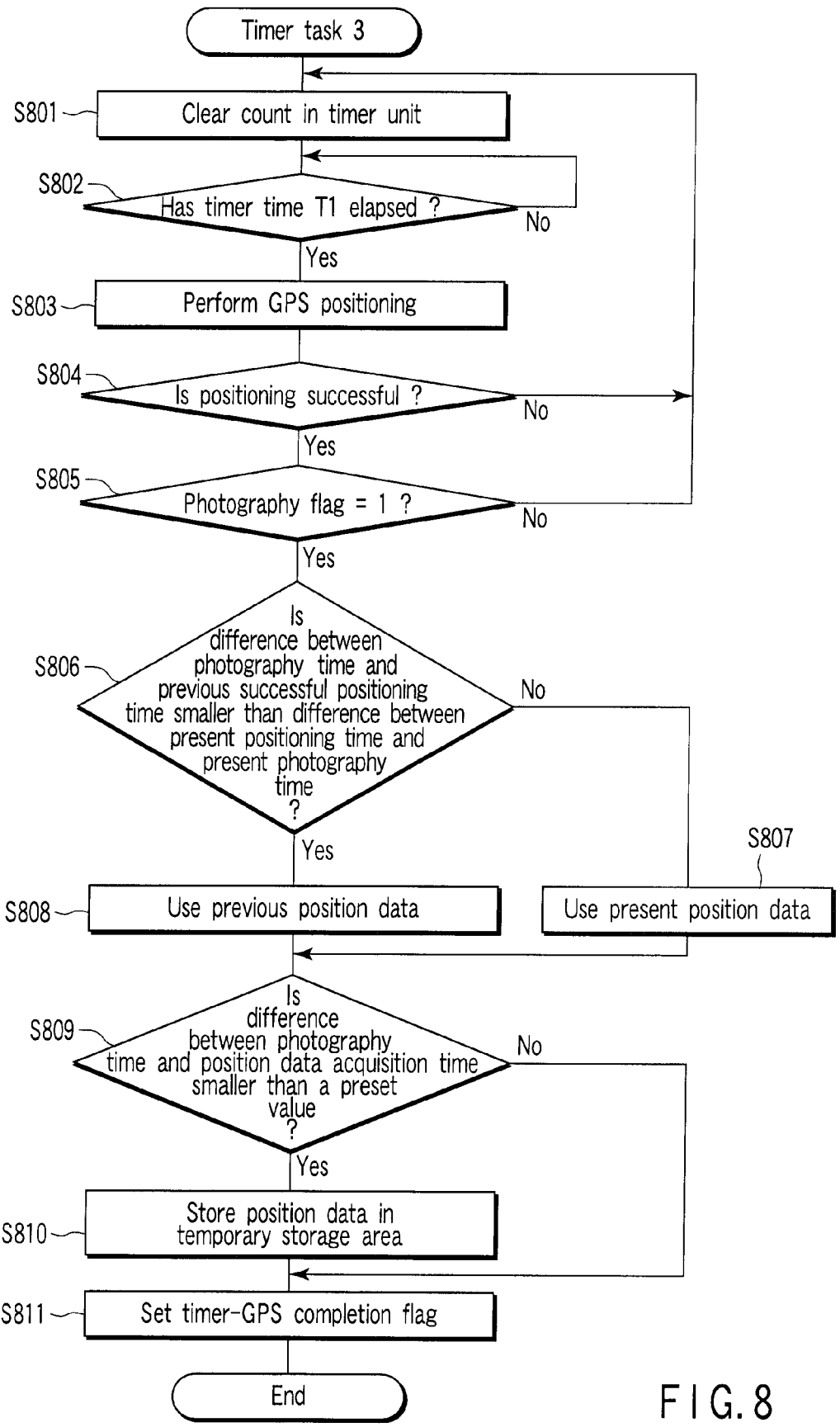
FIG. 8 is a flowchart explaining a process performed in a timer task 3.

The process shown in FIG. 7 is started when the battery is loaded in the electronic still camera 1 or when the power switch included in the switch unit 122 is turned on. First, the control unit 11 initializes a photography flag and a timer-GPS completion flag, both held in the storage unit 14 (setting both flags to 0) (Step S701). The photography flag has the same function as the photography flag described with reference to FIG. 2. The timer-GPS completion flag is a flag that indicates whether the GPS positioning has been performed at prescribed intervals in a timer task 3.

The control unit 11 then activates the timer task 3 at prescribed intervals, for acquiring the self-position data before the photography is started (Step S702). The timer task 3 will be described later in detail.

After the timer task 3 is activated, the control unit 11 determines whether the release switch has been turned on (Step S703). This step S703 is repeated till the release switch is turned on. If the release switch is found to have been turned on, in Step S703, the control unit 11 starts photography. Subsequently, the control unit 11 sets the photography flag to 1 (Step S704). Immediately after the completion of photography, the control unit 11 starts GPS positioning in order to acquire photography-site data (Step S705). Next, the control unit 11 determines whether the GPS positioning has been successfully performed (Step S706).

In Step S706, the GPS positioning may be found to have been successfully accomplished. In this case, the control unit 11 stores the position data thus acquired in the storage unit 14, as photography-site data, in association with the image data (Step S707). In this case, the position data obtained in the timer task 3 and stored in a temporary storage area is neglected. On the other hand, if the GPS positioning has failed, the control unit 11 waits for the termination of the timer task 3. Therefore, the control unit 11 determines whether the timer-GPS completion flag is 1 (Step S708).

In Step S708, the timer-GPS completion flag may be found to be 1, indicating that the timer task 3 has been completed. In this case, the control unit 11 determines whether the position data is stored in the temporary storage area of the storage unit 14 (Step S709). In Step S709, if the position data may be found to be stored in the temporary storage area of the storage unit 14, the control unit 11 stores the position data in the storage 14, as photography-site data, in association with the image data (Step S710).

The timer task 3 will be explained. Steps S801 to S804 shown in FIG. 8 are identical to Steps S301 to S304 shown in FIG. 3. Therefore, they will not be described.

If the GPS positioning is found successful in Step S804, the control unit 11 determines whether the photography flag is 1 (Step S805). The photography flag may be 0 in Step S805, indicating that no photography has been performed, the process returns to Step S801. In this case, the positioning is performed again upon lapse of another preset time T1.

In Step S805, if the photography flag is 1, the control unit 11 compares the difference between the time of photography and the time of previous successful positioning with the difference between the time of the present positioning and the time of the present photography. That is, the control unit 11 determines whether the difference between the time of photography and the time of previous successful positioning is smaller than the difference between the time of the present positioning and the time of the present photography (Step S806). In Step S806, if the difference measured at present is smaller, the control unit 11 uses the position data acquired this time (Step S807). In Step S806, if the difference measured at previous time is smaller, the control unit 11 uses the position data acquired the previous time (Step S808).

Next, the control unit 11 determines whether the difference between the time of photography and the time of acquiring the position data used in Step S807 or S808, is smaller than a preset value (Step S809). If this difference is found to be smaller than the preset value, in Step S809, the control unit 11 stores the position data acquired, in the temporary storage area of the storage unit 14 (Step S810).

In Step S809, the difference may be found to exceed the preset value. In this case, the position data is not stored in the temporary storage area, and the process goes to the next step. That is, the position data is not used, because the time of photographing the object and time of acquiring the position data differ from each other. Assume that the user carrying the electronic still camera enters a subway station, gets on a train, get off at another station, and takes pictures in the underground shopping center there. Since the GPS waves do not reach the subway trains, wrong position data may be stores. (This may happen in the trains running on the ground, too, if the GPS waves do not reach them.) This is why the decision is made in Step S809 and the position data is not used if a time longer than the preset value has elapsed from the acquisition of the position data. In view of this, it is desired that the preset value used in Step S809 should be set in accordance with the user's custom or manner of using the electronic still camera.

If the position data is stored in Step S810 or if the difference is found to exceed the preset value in Step S809, the control unit 11 sets the timer-GPS completion flag to 1 (Step S811). The timer task 3 is thus terminated.

In the process described above, the GPS positioning is performed at intervals of timer time T1 in the timer task 3. The position data can thereby be acquired at the time that is most close to the time of photography.

In Step S710 shown in FIG. 7, the data indicating that the position data has been acquired at timing different from the time of photographing the object may be stored in association with the image data when the position data is stored as photography-site data in the storage unit 14 in association with the image data. If so stored, this data can be used to determine the credibility of the position data before the position data undergoes any process.

Moreover, in Step S710, the data indicating the time of acquiring the position data may be stored in association with the image data when the position data is stored as photography-site data in the storage unit 14 in association with the image data. If so stored, this data can serve to determine a difference between the time of acquiring the position data, which is other than the time of photographing the object, and the time of actually photographing the object. Therefore, the credibility of the position data can be determined more correctly.

Second Embodiment

Figure 9:
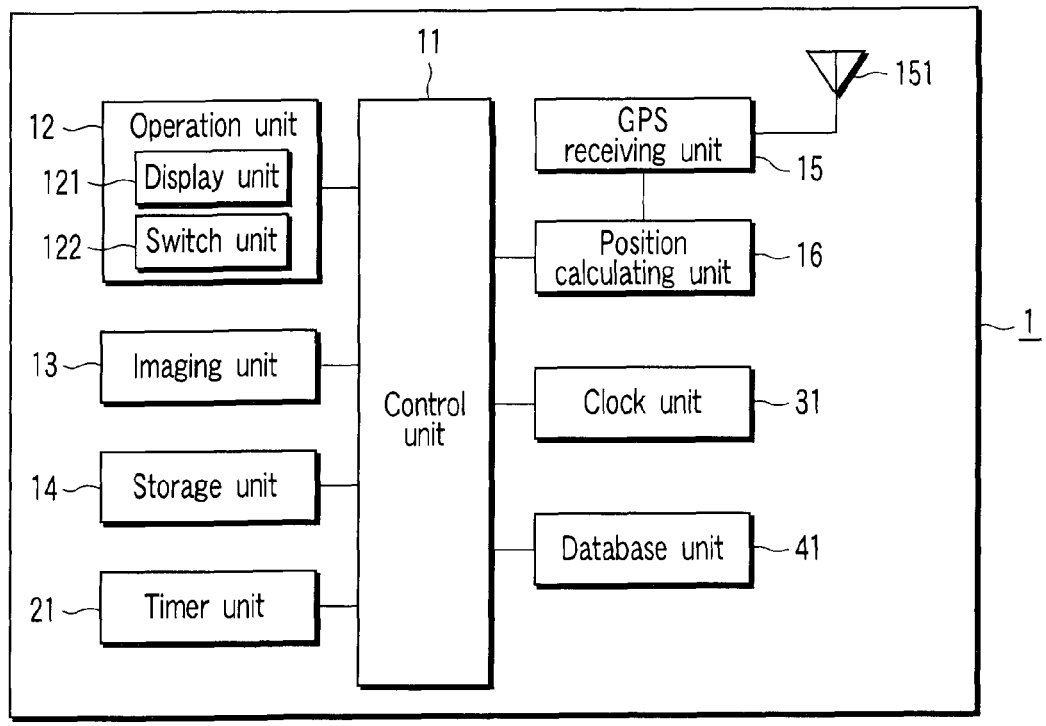
FIG. 9 is a block diagram showing a configuration an electronic still camera according to a second embodiment of the invention.

A second embodiment of this invention will be described. FIG. 9 is a block diagram showing a configuration an electronic still camera according to the second embodiment. The electronic still camera according to the second embodiment differs from the electronic still camera shown of FIG. 6, in that a database unit 41 is provided, to which the control unit 11 may refer. The database unit 41 stores the names and addresses of places and the names of the facilities and buildings existing in the places, in association with the longitude/latitude position data items about the places. The database unit stores the map data items corresponding to the longitude/latitude position data items. The name and address of any place, the facilities and buildings existing in the place, and the map data about the place can therefore be retrieved from the database unit 41.

How the second embodiment operates will be explained. In the first embodiment of the invention, the position data at a time close to the time of photographing an object can be stored, as photography-site data, in association with the image data. In the second embodiment, the control unit 11 correlates the position data with the data stored in the database unit 41. As a result, the user can obtain the address and name of the place corresponding to any position data, and the name of the facilities and buildings existing in the place, and the visual map data about the place.

Such data items may be presented in a visible form, either displayed by, for example, the display unit 121 or printed by a printer (not shown). This enables the user of the electronic still camera to understand the photography-site data easily.

If the difference between the time of photographing the object and the time of acquiring the position data is longer than a preset time, the position data will not be utilized and no data corresponding to the position data will be inevitably acquired. In this case, only the image data is displayed or printed.

A first modification of the second embodiment will be described. The first modification of the second embodiment is not an electronic still camera, but a data processing apparatus that has some of the functions of the electronic still camera shown in FIG. 9.

Figure 10:
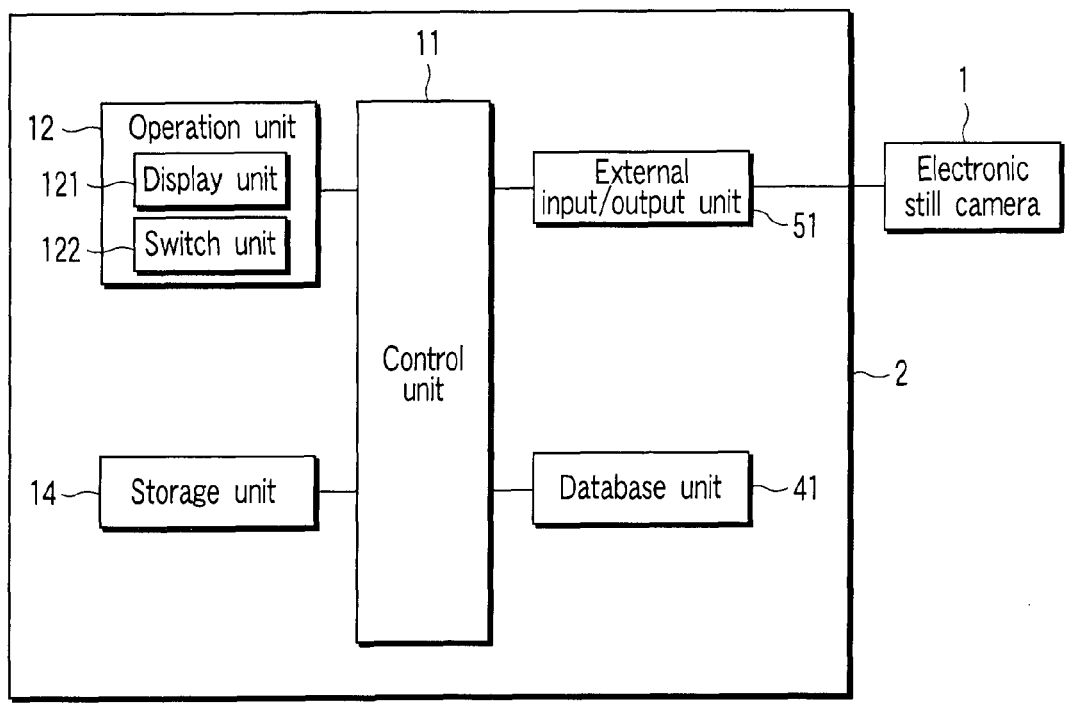
FIG. 10 is a block diagram showing a configuration of a data processing apparatus according to a first modification of the second embodiment.
Figure 11:
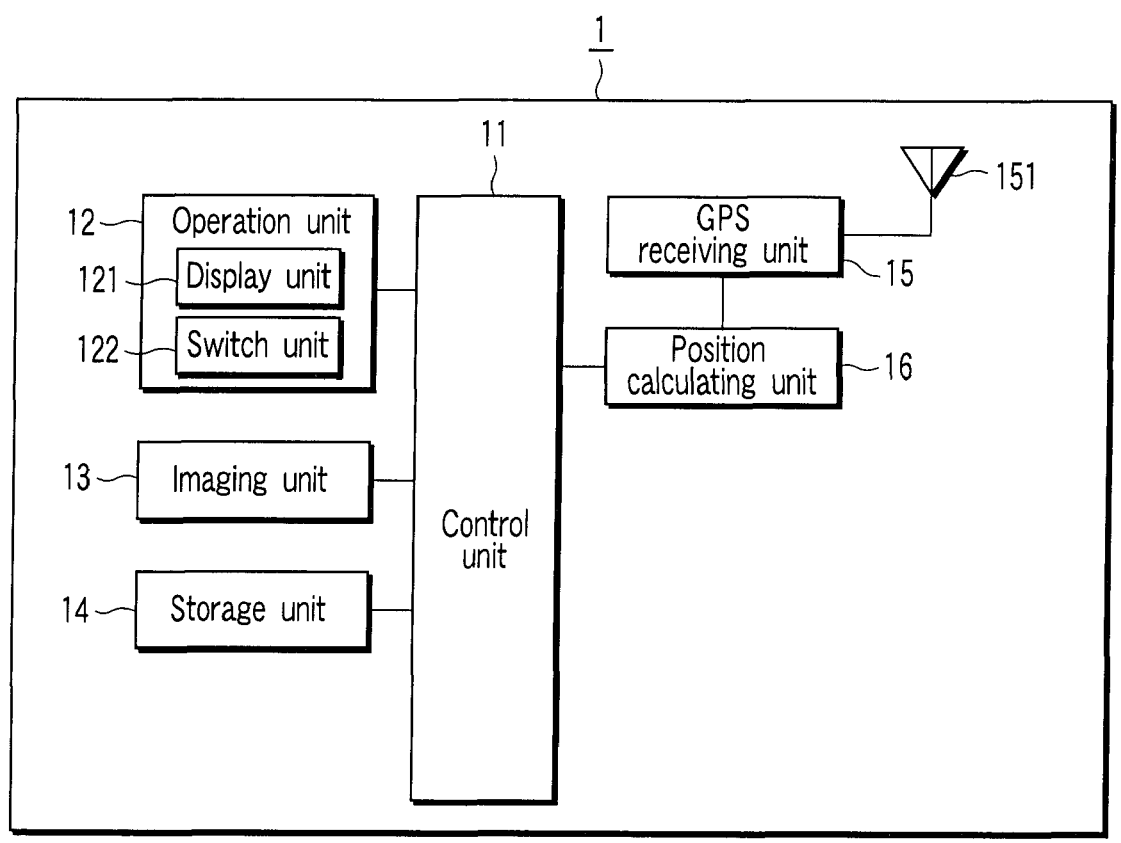
FIG. 11 is a block diagram showing a configuration of a conventional electronic still camera.

FIG. 10 is a block diagram showing a configuration of the data processing apparatus 2 according to a first modification of the second embodiment. The apparatus 2 is connected to the electronic still camera 1 of FIG. 6 and can exchange data with the electronic still camera 1. The data processing apparatus 2 shown in FIG. 10 is, for example, a personal computer, a printer, a small data storage, or the like. If the apparatus 2 is a printer, a printing unit (not shown) is connected to the control unit 11. If the apparatus 2 is a small data storage, a storage device (not shown), such as a hard disk drive, is connected to the control unit 11.

Moreover, an external input/output unit 51 is provided between the control unit 11 and the electronic still camera 1. The unit 51 is an interface that can transmit and receive data to and from the electronic still camera 1. To achieve, for example, wire communication, the external input/output unit 51 may be serial communication such as a RS-232, USB communication, or a wired LAN designed for IEEE 802.3 communication. To accomplish radio communication, the unit 15 may be, for example, a wired LAN designed for IEEE 802.11 communication or Bluetooth (trademark).

How the first modification of the second embodiment operates will be explained. In the electronic still camera 1 shown in FIG. 10, the position data acquired at a time close to the time of photographing an object can be stored as photography-site data, in association with the image data, even if the GPS positioning cannot be achieved when the object is photographed indoors. The image data and the photography-site data, both acquired in the electronic still camera 1, are supplied via the external input/output unit 51 to the control unit 11 of the data processing apparatus 2. The control unit 11 collates the photography-site data with the data held in the database unit 41. The control unit 11 thereby obtains the visible map data items, such as the address and name of the photography site and the names of the facilities and buildings existing in the photography site. These map data items are displayed by the display unit 121 or printed on a paper sheet, providing the photography-site data in visible form. Being visible, these data items are easy for the user to understand.

In the first modification, the image processing apparatus 2 may perform a part of the process the first embodiment performs, such as determining whether the position data should be stored in the storage unit 14, in accordance with the difference between the time of photographing the object and the time of acquiring the position data.

If the difference between the time of photographing the object and the time of acquiring the position data is longer than the preset time, the position data will not be utilized and no data corresponding to the position data will be inevitably acquired. In this case, only the image data is displayed or sprinted.

A second modification of the second embodiment will be described. The second modification is identical to the first modification in basic configuration and basic operation. It differs, nonetheless, in that the database unit 41 stores not only position data items, such as the addresses and names of places, the names of the facilities and buildings existing in the places, and the map data associated with the position data items, but also the position data items that represent the entrances and exits of the facilities and buildings.

Since the database unit 41 stores the position data items that represent the entrances and exits of the facilities and buildings, the user can determine that the image data has been acquired in a facility if the position data acquired immediately before or after the acquisition of the image data represents the entrance to the facility, even if the position data about the facility has not been acquired. Further, the data showing that the image data has been acquired in the facility can be displayed, printed or saved.

A third modification of the second embodiment will be described. The third modification is identical to the first and second modifications in basic configuration and basic operation. It differs in that the GPS receiving unit 15 and position calculating unit 16 can calculate not only the latitude and longitude, but also the altitude. Further, the database unit 41 of the third modification stores the data representing the altitudes of various places.

How the third modification operates will be explained. The GPS receiving unit 15 and the GPS position calculating unit 16 cooperate, generating, from the result of GPS positioning, the data representing the altitude of the photography site. The altitude data is supplied to the control unit 11. The control unit 11 collates the altitude data with the altitude data stored in the database unit 41, determining whether the photography site is above the ground. If the site is found to exist above the ground, the control unit 11 determines that the photography has been performed in an aircraft. In this case, the display unit 121 displays an additional data item showing this fact, such as "photographed above XX," together with the photography-site data. Alternatively, these data items are stored in the storage unit 14. Thus, the third modification can acquire photography-site data easy for the user to understand.

A fourth modification of the second embodiment will be described. The fourth modification is identical to the second and third modifications in basic configuration and basic operation. It differs in that the database unit 41 stores the data representing the flight information (flight route and flight-time schedule) of the aircraft in which the user is aboard.

How the fourth modification operates will be explained. The GPS receiving unit 15 and the GPS position calculating unit 16 cooperate, generating, from the result of GPS positioning, the data representing the altitude of the photography site. The altitude data is supplied to the control unit 11. The control unit 11 collates the altitude data with the altitude data stored in the database unit 41, determining whether the photography site is above the ground. If the photography site is found above the ground, the control unit 11 collates the photography site with the flight route and flight-time schedule of the aircraft. The display unit 121 displays the result of collation in the form of a message of, for example, "ΔΔ Airways, Flight No. XXX, above □□." Alternatively, these data items are stored in the storage unit 14. Thus, the fourth modification can provide photography-site data that is easier for the user to understand, than the photography-site data the third modification provides.

The present invention has been explained, with reference to some embodiments. Nonetheless, the invention is not limited to the embodiments described above. Various changes and modifications can be, of course, made within the scope and spirit of the invention.

Further, the embodiments described above include various phases of the invention. The components disclosed herein may be combined in various ways to make various inventions. For example, even if some components of any embodiment described above are not used, the resulting configuration can be considered as the invention so long as it solves the problem specified above and achieves the advantages described above.

The present invention can provide an electronic still camera that can acquire photography-site data even if the unit for detecting its own position, such as GPS, fails to acquire the data representing the position, and to provide an image processing apparatus that processes the image data acquired by the electronic still camera.

What is claimed is:

1. An electronic still camera comprising:
   a position-data acquisition unit which acquires self-position data representing the position of the electronic still camera;
   a storage unit which stores the self-position data as photography-site data, in association with image data acquired by photographing an object;
   a setting unit which sets, in the storage unit, the self-position data acquired by the position-data acquisition unit at a time different from a time of photographing the object, when the self-position data is not acquired at the time of photographing the object;
   a collating unit which collates the photography-site data with a database containing building-name data and position data of an entrance of a building; and
   a process control unit which performs at least one of a process of visualizing the building-name data and a process of storing the building-name data in the storage unit, when the time of photographing the object does not coincide with a time of acquiring the photography-site data and the photography-site data collated with the database is found to represent an entrance to the building.

2. An image processing apparatus comprising:
   a collating unit which collates photography-site data with a database containing building-name data and position data of an entrance of a building, on the basis of the photography-site data supplied by such an electronic still camera as described in claim 1; and
   a process control unit which performs at least one of a process of visualizing building-name data and a process of storing the building-name data in the storage unit, when the time of photographing the object does not coincide with a time of acquiring the photography-site data and the photography-site data collated with the database is found to represent an entrance to the building.

3. An image processing apparatus wherein photography-site data supplied from such an electronic still camera as described in claim 1 contains data representing an altitude of the electronic still camera, and further comprising:

a map-data collating unit which collates the photography-site data with map data, on the basis of the photography-site data supplied by the electronic still camera; and a process control unit which performs at least one of a process of visualizing additional data representing that the photography has been performed in an aircraft, in association with the image data, and a process of storing the additional data in the storage unit, when a result of a collation performed by the map-data collating unit shows that the electronic still camera is far from at least one of the ground and the sea.

4. The image processing apparatus according to claim 3, further comprising:

a flight-data collating unit which collates a database holding flight data about the aircraft, and wherein the process control unit performs, in accordance with the collation performed by the flight-data collating unit, at least one of the process of visualizing data about the aircraft in which the photography has been performed, in association with the image data, and the process of storing the data about the aircraft in the storage unit.

5. An electronic still camera comprising:

a position-data acquisition unit which acquires self-position data representing the position of the electronic still camera and containing data representing an altitude of the electronic still camera;

a storage unit which stores the self-position data as photography-site data, in association with image data acquired by photographing an object;

a setting unit which sets, in the storage unit, the self-position data acquired by the position-data acquisition unit at a time different from a time of photographing the object, when the self-position data is not acquired at the time of photographing the object;

a map-data collating unit which collates the photography-site data with map data; and a process control unit which performs at least one of a process of visualizing additional data representing that the photography has been performed in an aircraft, in association with the image data, and a process of storing the additional data in the storage unit, when a result of a collation performed by the map-data collating unit shows that the electronic still camera is far from at least one of the ground and the sea.

6. The electronic still camera according to claim 5, further comprising:

a flight-data collating unit which collates a database holding flight data about the aircraft, and wherein the process control unit performs, in accordance with a collation performed by the flight-data collating unit, at least one of the process of visualizing additional data representing that the photography has been performed in the aircraft, in association with the image data, and the process of storing the additional data in the storage unit.

* * * * *